May 21, 1963 G. A. LYON 3,090,337
METHOD OF MAKING WHEEL COVER MEMBERS AND THE LIKE
Filed July 11, 1960 2 Sheets-Sheet 1
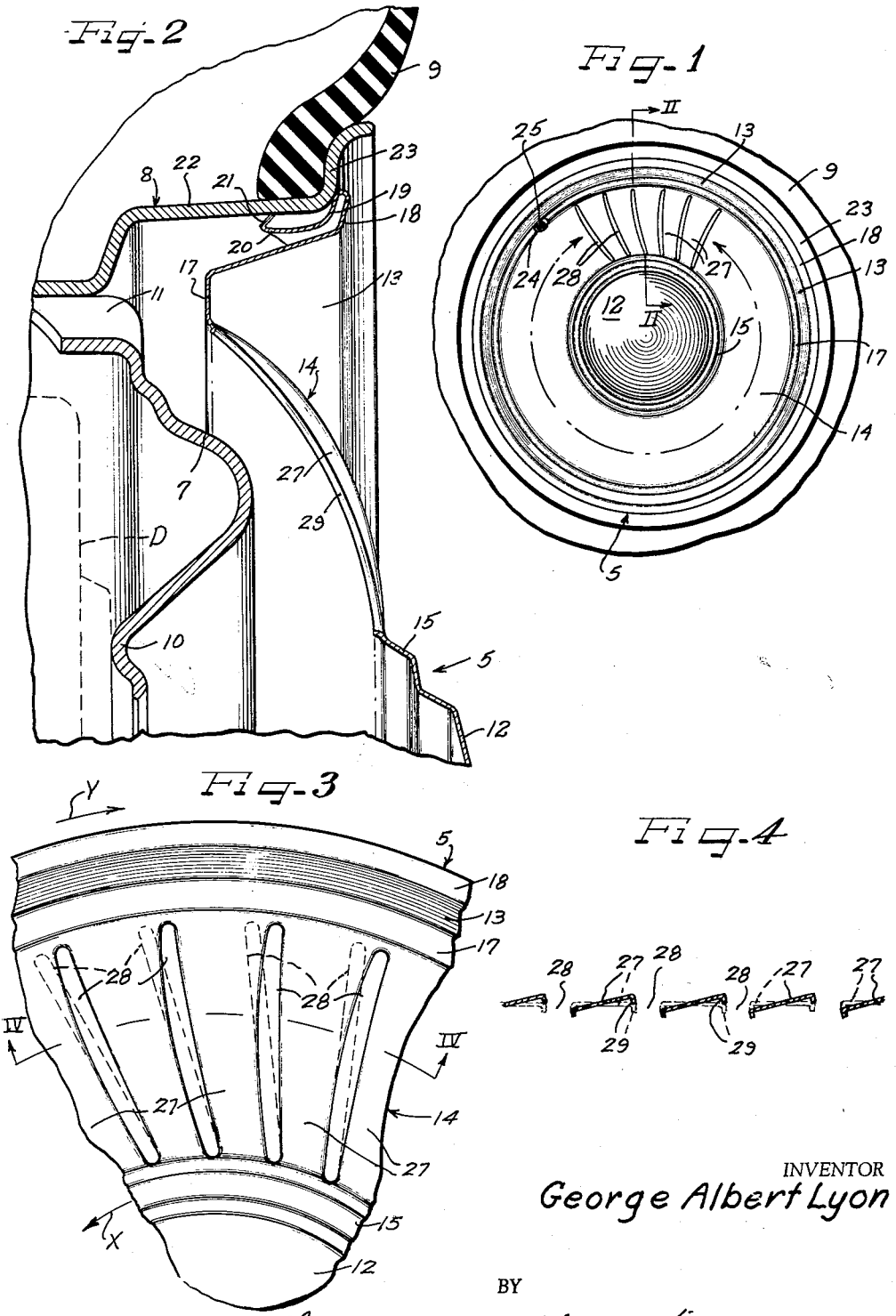
INVENTOR
George Albert Lyon
BY
Hill, Sherman, Meroni, Gross & Simpson ATTORNEY

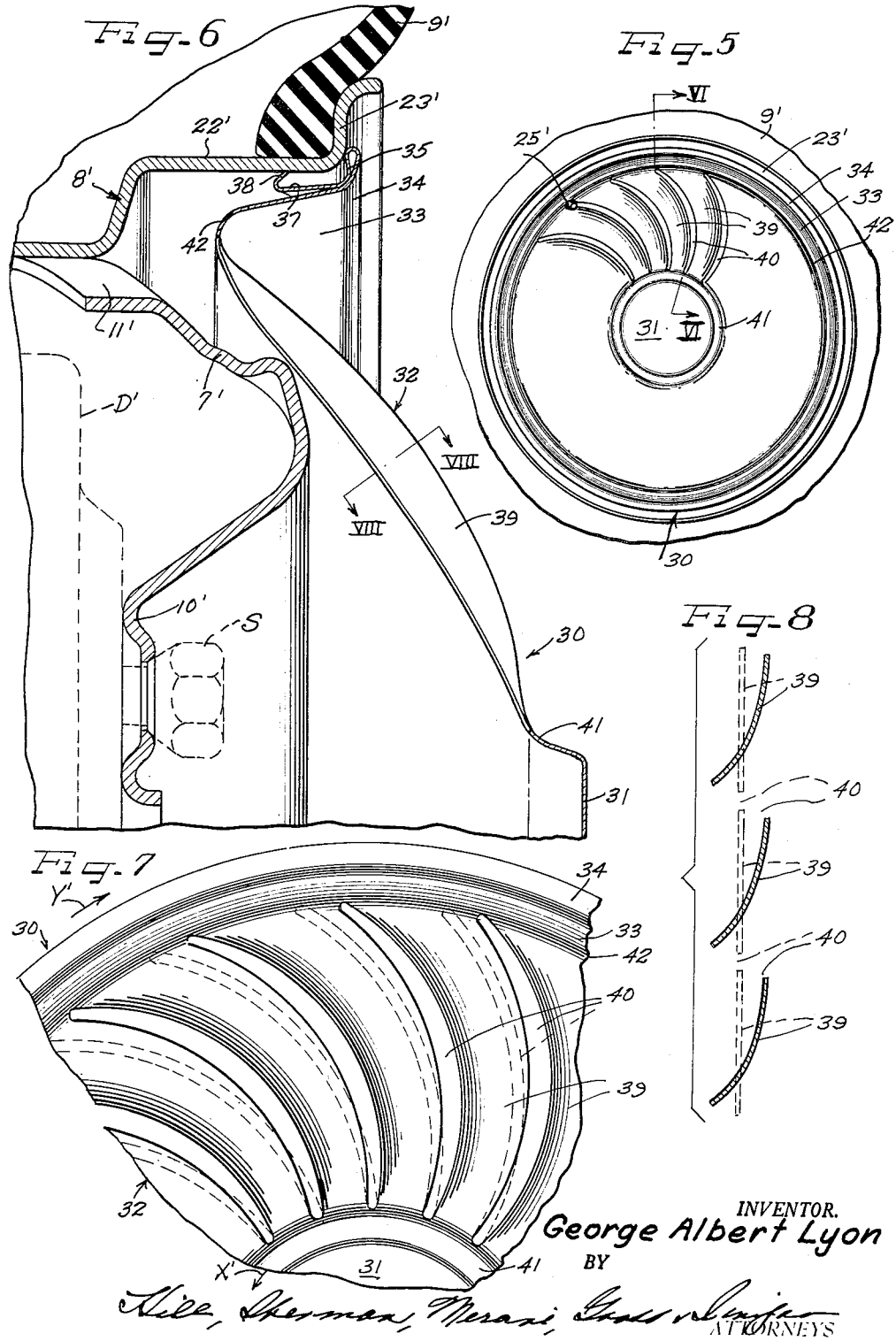

United States Patent Office 3,090,337
Patented May 21, 1963

3,090,337
METHOD OF MAKING WHEEL COVER MEMBERS AND THE LIKE
George Albert Lyon, Detroit, Mich., assignor to Lyon Incorporated, Detroit, Mich., a corporation of Delaware
Filed July 11, 1960, Ser. No. 42,464
9 Claims. (Cl. 113—116)

The present invention relates to improvements in making sheet metal members with fluid impelling louvers, and more particularly concerns the making of wheel cover members of the kind to be disposed in ornamental and protective relation over the outer sides of vehicle wheels, with the louvers serving to promote air circulation therethrough.

The present application is a continuation-in-part of my pending applications Serial No. 27,713 filed May 9, 1960, now abandoned, and Serial No. 586,619 filed May 22, 1956 now Patent No. 3,014,446, granted December 26, 1961, and through Serial No. 586,619 a continuation-in-part of Serial No. 368,735 filed July 17, 1953, now abandoned.

It has, of course, been heretofore proposed to provide sheet metal articles such as wheel covers with air circulation promoting louvers. An early example of such wheel covers is found in my now expired Patent No. 1,958,484. However, formation of the louvers as exemplified in that patent is quite costly due to the need for expensive forming dies to shape the louvers. Furthermore, since it is desirable in wheel covers to have left-hand and right-hand louvers on respective covers, two complete sets of dies must be provided. Therefore, because of the excessive cost, die formed louvers, in spite of their air circulation efficiency and the present day need for brake drum and wheel cooling, have not been utilized to any appreciable extent due to necessarily high cost.

According to the method in my aforesaid Patent No. 3,014,446 formation of louvers in sheet metal articles such as wheel cover members is greatly simplified and advantageously accomplished at quite nominal manufacturing cost by an entirely new concept, namely, by relatively torsionally displacing concentric portions of the member to effect displacement of slot-separated louver-sections of an annular portion of the member between the torsionally displaced concentric portions. According to that teaching, the intermediate slot-subdivided portion is initially formed on a pronounced generally S-shaped or ogee radial curvature in order to implement the torsionally effected displacement and control the ultimate shape of the louvers. However, this places some limitations upon design, and in wheel covers, especially, styling is an important consideration.

I have now discovered, and the present invention is especially concerned with certain modification and improvements upon the method of my aforesaid pending application having as an object the formation of what may be termed twisted louvers by relative torsional displacement of concentric portions of a sheet metal article with an intervening slot-subdivided louver area or portion in which the initial radial curvature is substantially all on a common radius rather than a sinuous, ogee curvature.

Another object of the present invention is to provide an improved method of making sheet metal articles with air circulation louvers by a resultant of compression, shortening, bending and twisting of slot-separated sections of an intermediate portion of the sheet metal member to turn up the sections uniformly into louvers.

A further object of the invention is to provide an improved method, generally, of making louvered sheet metal articles.

Still another object is to provide an improved method of making louvered articles, lending itself to a variety of louver shapes and styling preferences.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying a cover made according to the method of the present invention;

FIGURE 2 is an enlarged fragmentary radial sectional view taken substantially on the line II—II of FIGURE 1;

FIGURE 3 is a fragmentary outer side elevational view of the cover of FIGURES 1 and 2;

FIGURE 4 is a more or less schematic sectional detail view taken substantially on the line IV—IV of FIGURE 3;

FIGURE 5 is an outer side elevational view of a wheel structure embodying a modified cover made according to the method of the present invention;

FIGURE 6 is an enlarged fragmentary radial sectional detail view taken substantially on the line VI—VI of FIGURE 5;

FIGURE 7 is a fragmentary outer side elevational view of the cover of FIGURES 5 and 6; and FIGURE 8 is a more or less schematic sectional detail view taken substantially on the line VIII—VIII of FIGURE 6.

In its broadest aspect, the present invention relates to a method of making a sheet metal article wherein an elongated strip is shaped, with the ends of the strip a predetermined distance apart, and then simultaneously laterally relatively offsetting the ends of the strip and shortening the distance between the ends of the strip to effect a compression and twisting of the strip into tilted relation to the sides of the strip relative to the original plane of the strip. In a practical application of this method, a portion of a sheet metal article is subdivided into a series of separated elongated strips with the ends of the strips integrally connected, and simultaneously relatively offsetting the ends of the strips while compressing the strips to bring respective ends thereof closer together whereby to effect tilting of the strips into louver form.

As an example of a sheet metal member provided with fluid impelling and in this instance air circulation promoting, louvers according to the present invention, a wheel cover member 5 is depicted in FIGURES 1–4 which is constructed and arranged to be disposed in protective and ornamental relation over the outer side of a vehicle wheel such as an automobile wheel including a disk spider body 7 supporting a multi-flange drop center tire rim 7 arranged to carry a pneumatic tire 9.

Centrally the wheel body 7 has a bolt-on flange 10 by which it is adapted to be secured in any preferred manner as by means of attachment screws or bolts (not shown) to the axle structure of an associated vehicle including a brake drum D. About its periphery and at juncture with the tire rim 8, the wheel body 7 is provided with suitable openings 11 through which air may circulate for cooling the wheel and more particularly the brake drum D.

Although the cover member 5 is herein depicted as of the full disk type, of a diameter to overlie not only the wheel body 7 but also substantially the tire rim 8, the cover member may also comprise a ring shaped structure adapted to coact with a central hub cap. Any suitable sheet metal may be utilized in making the cover member 5, although stainless steel sheet or strip has been found especially satisfactory. Such material lends itself not only to satisfactory drawing in production press equipment, but also to highly desirable outer face finishing such as by polishing and if desired chrome plating.

In the exemplary form depicted, the cover member 5 has concentric radially inner crown and radially outer portions 12 and 13, respectively, separated by an intermediate portion 14 of substantial width. In this instance, the intermediate portion 14 is connected at its radially inner end integrally in one piece to the crown portion 12 by means of an annular reinforcing rib formation 15. From the crown rib formation 15, the intermediate cover portion 14 slopes radially outwardly and axially inwardly to join the outer marginal portion 13 of the cover on an annular axially inwardly inset annular reinforcing rib formation 17 in this instance of a diameter to overlie the juncture between the wheel body and the tire rim.

From the indented, inset rib formation 17, the marginal cover portion 13 extends radially and axially outwardly and has a radially outwardly turned marginal terminus 18 carrying therebehind cover retaining means engageable with the tire rim 8. In this instance, the marginal terminus 18 has an underturned flange 19 carrying retaining fingers 20 having retaining terminals 21 engaging retainingly with an intermediate axially outwardly extending flange 22 of the tire rim, the underturned flange 19 of the cover bottoming against a terminal flange 23 of the tire rim at the axially outer end of the intermediate flange 22.

In applying the cover to the outer side of the wheel, a valve stem aperture 24 in the indented portion 17 of the cover is registered to have projecting therethrough a valve stem 25, and the cover is then pressed axially inwardly onto the wheel with the retaining fingers 20 through the terminals 21 thereof grippingly retainingly engaging the intermediate flange 22. Pry-off of the cover may be effected by means of a suitable tool inserted behind the underturned flange 19 of the cover.

Air circulation through the wheel in running thereof is promoted by an annular series of louvers 27 into which the intermediate cover portion 14 is separated by symmetrically disposed transverse air circulation slot openings 28. As best seen in FIGURES 2 and 4, these openings which extend substantially entirely across the intermediate portion 14 are defined by narrow axially inwardly turned reinforcing and finishing flanges 29.

In general the cover 5 may be made according to the method of my Patent No. 2,707,449 dated May 3, 1955. This comprises a series of drawing and forming steps wherein the general contour of the cover and the cover retaining means, inclusive of the outer marginal extremity of the cover member, are completed. In the present instance, the cover member will be completed to this point with the intermediate annular cover portion 14 solid and imperforate but transversely, that is in the radial direction, of axially outwardly arched form on a predetermined radius. Then the cover member may be polished on its outer surface, inclusive of the as yet imperforate intermediate cover portion 14 which, because it is solid and imperforate and annular, can easily be polished in the usual production rotary polishing equipment.

After the polishing has been completed, the cover member is placed in suitable die apparatus and the generally radially transverse slots 28 are punched in the intermediate annular cover portion 14 and the axially inwardly projecting narrow reinforcing and finishing flanges 29 formed about the perimeter of each slot. As initially formed, the slots 28 are, as best seen in dash outline in FIG. 3, punched on longitudinal axes that are uniformly tilted or angularly biased in one circumferential direction from a true radius. In the illustrated instance the radially outer ends of the slots as initially formed are disposed about 18° from a true radius running from the radially inner ends of the respective slots. In a desirable form, the slots are initially formed substantially straight. A practical width of the slots 28 is about 3/16 inch.

After the slots 28 and the finishing and reinforcing flanges 29 have been completed, the cover member is placed in suitable apparatus wherein the radially inner and radially outer portions of the cover, namely, the crown portion 12 and the reinforcing ribs 15 at the radially inner part of the cover and the radially outer marginal portion 13 including the indented or inset portion 17 at the radially outer part of the cover, are relatively torsionally displaced, thereby to displace the opposite ends of the spoke-like louver sections 27 relatively circumferentially toward but not necessarily to radial orientation. Such relative torsional displacement is schematically indicated by the oppositely directed directional arrows X and Y adjacent to the radially inner and radially outer portions of the cover, respectively. As a result of such torsional displacement, the radially inner and outer ends of the spoke sections 27 are, of course, similarly displaced relative to one another by virtue of their integral one-piece attachment to the substantially rigid annular portions 15 and 17, respectively, of the cover member. Since the rigid annular portions 15 and 17 strongly resist either radial or axial displacement in themselves, all displacements, readjustments and material compensations incident to the relative torsional displacement described occur in the louver sections 27, affording the highly advantageous, uniform, controlled shaping of the louver sections 27 from the circumferentially coplanar relationship as indicated in dash outline in FIG. 4 into the tilted louver relationship shown in full outline in FIGS. 2, 3 and 4.

As the opposite ends of the respective louver sections 27 move from the predetermined initial circumferentially angular disposition of the louver sections toward but not necessarily into radial alignment, there is a resulting compression and shortening of the distance between the respective ends inasmuch as the ends are confined between the relatively radially unyielding radially inner and radially outer portions 15 and 17, respectively of the cover member. At the same time, there is a uniform, controlled bending and twisting of the louver sections and since the bending and twisting and compression is carried beyond the elastic limit of the material, there is a permanent setting of the material of the louver sections in the turned up edges at the axially outer side of the cover member and turned down edges at the axially inner side of the cover member, as indicated on comparison of the full outline tilted disposition with the dash outline generally coplanar disposition, shown in FIG. 4.

By virtue of the axially outwardly bowed normal contour of the louver portion 14, a displacement bias is provided for turning outwardly of the leading sides or edges of the louver sections 27 located to be moved toward the straightening out, that is toward radial, orientation during torsional displacement, while the trailing sides or edges of the louver sections tilt axially inwardly.

It will be recognized that as thus described a right-hand wheel cover member is provided which when mounted on a wheel on the right side of a vehicle, as shown, will effect circulation of air axially inwardly through the cover and through the wheel openings 11. On the other hand, for a left-hand wheel cover the slots 28 are formed to angle in the opposite circumferential direction from that shown in FIG. 3 and the torsional displacement of the radially inner and radially outer portions of the cover and thus of the radially inner and radially outer ends of the spoke sections 27 will be effected just oppositely to that depicted in FIG. 3 so that the louver sections 27 will tilt axially outwardly in the counterclockwise direction as contrasted to the clockwise direction shown in FIGS. 3 and 4.

In one, and possibly the most expedient, manner of effecting the torsional relative displacement for longitudinally compressing and shortening and bending and twisting the louver sections 27 into the louver form, a twisting die arrangement may be used wherein respective sets of pins engage within the radially inner and radially outer ends of the slots 28, the dies then being relatively torsionally displaced to the proper extent to effect shaping of the louver strips 27. On the other hand, suitable clamping dies may engage the radially inner and radially outer portions of the cover member while leaving the intermediate louver portion 14 free and such gripping dies then relatively torsionally moved to the desired extent.

In effecting punching of the slots 28 and then twisting of the cover portions for shaping of the louvers 27, marring of the polished surface of the cover member can be entirely avoided, and more particularly there is freedom from marring of the surface finish of the louvers 27 so that no touching up or buffing is necessary after the louvers have been completed. After degreasing of the completed cover member to remove handling marks and any grease or oil that may have been acquired from the forming dies, the cover may then be ready for packing or use. Where the cover is to be plated such as flash chrome plating, immediately after the degreasing the cover is so plated and is then ready for use or packing as the case may be. Where the cover member is made from brass it may be desired after the degreasing to nickel plate it.

Although in the completed cover, the louvers 27 rather closely approximate more or less conventional die-bent and formed louvers, with the openings 28 between the louvers extending almost straight, formation of the louvers has been accomplished by the simple expedient of punching the separating slots between the louvers and then torsionally displacing the ends of the louver sections, as described, to afford the desired tilted vane louver shape.

In the modification of FIGURES 5-8, is shown a wheel cover 30 representing an example of a louvered sheet metal article made according to the method of the present invention but demonstrating an increased impeller effectiveness. Details of the wheel are substantially the same as in FIGURES 1 and 2 and in the interests of expediting description identical but primed reference numerals have been applied in FIGURES 5 and 6 and it will be understood that the description of the thus identified elements is the same as for the corresponding elements in FIGURES 1 and 2. The only real difference in FIGURE 6 insofar as the wheel is concerned resides in the phantom showing of an attachment bolt or screw S by which the bolt-on flange 10' of the wheel body 7' is adapted to be secured to the vehicle axle and brake drum D'. It will be understood that the same sort of attachment bolt or screw S could be used in the disclosure of FIGURE 2.

Similarly as described in connection with the cover 5, the cover 30 may be made from any suitable sheet metal such as stainless steel sheet or strip. Centrally the cover member 30 has a generally axially outwardly projecting crown portion 31 separated by an intermediate annular portion 32 of substantial width from a radially outer marginal portion 33 projecting generally radially and axially outwardly and having a radially outwardly turned marginal terminus portion 34 provided with an underturned flange 35 carrying retaining fingers 37 which terminate in retaining terminals 38 retainingly engageable with the intermediate flange 22' of the tire rim while the underturned flange 35 engages the tire rim at the axially outer end of the intermediate flange 22'. Application and removal of the cover 30 with respect to the wheel is effected similarly as described for the cover 5.

Air circulation through the wheel in the running thereof is promoted by an anular series of air motivating louvers 39 into which the intermediate annular cover portion 32 is separated by symmetrically disposed transverse air circulation slot openings 40. At their radially inner ends, the louver sections 39 are connected integrally in one piece to an annular reinforcing rib formation 41 on the side of the crown 31, while at their radially outer ends the spoke sections are connected integrally in one piece with an axially inwardly inset annular reinforcing rib formation 42 of the cover member and in this instance of a diameter to overlie the juncture area between the wheel body 7' and the tire rim 8'.

Air moving effectiveness of the louvers 39 is enhanced by having the same of substantially greater length than the radial distance across the intermediate cover portion 32, accomplished by having the separating slots 40 and the louvers of substantial arcuate shape with the bow of the arc projecting in one circumferential direction.

In forming the louvers 39, the cover member is completed as to contours, with the intermediate annular portion 32 solid and imperforate but transversely, radially generally axially outwardly arched on a predetermined radius. Polishing of the outer surface of the cover, inclusive of the imperforate intermediate portion 32 may be completed, whereafter the slots 40 are punched in the intermediate portion 32. In order to attain the maximum length of the louvers 39, greater than the radial dimension of the intermediate cover portion 32, the slots 40 are arcuate and with their radially outer ends offset in one circumferential direction to a substantial extent relative to the radially inner ends of the slots, substantially as shown in dash outline in FIG. 7. In this instance, the radially outer ends of the slots 40 are initially offset close to 45° from a true radius running from the radially inner ends of the respective slots. In width the slots may be about 3/16 inch as initially formed.

After the slots 40 have been completed, the cover member is placed in suitable apparatus wherein the radially inner and radially outer portions of the cover, that is, the crown portion 31 and the adjacent reinforcing rib 41 and the radially outer marginal portion 33, including the indented or inset rib portion 42, are relatively torsionally displaced as schematically indicated by the oppositely directed directional arrows X' and Y'. Such torsional displacement has the effect of moving the respective opposite ends of the slots relatively closer toward the radius lines through the radially inner ends of the slots but by only a few degrees consistent with the amount of compression, twisting, bending and shortening of the distance between the ends of the spoke sections 39 which are confined between the relatively radially unyielding radially inner and radially outer portions 41 and 42 of the cover member. Since the louver sections 39 are all symmetrically initially shaped, the twisting, bending shaping thereof will also occur symmetrically, turning the leading sides or edges of the louver sections 39 to tilt toward the axially outer side of the cover member and tilting the trailing sides or edges of the louver sections generally axially inwardly. The end result of the compressive torsional displacement of the louver sections is graphically illustrated in FIGURE 8 where the dash outline position shows the louver sections coplanar in circumferential direction while the full outline position shows the same louvers as they appear after the torsional displacement formation thereof into tilted relationship. It will be observed that by virtue of the curvate form of the slots 40 there is a quite substantial tilting of the louver sections 39 accomplished by only a relatively short relative torsional displacement of the opposite ends of the louver sections. Moreover, by the relatively great axial displacement of the opposite edges of the respective louver sections, the gap between the adjacent edges of louver sections are correspondingly large. Thereby large fluid displacement capacity is afforded for the louvers 39.

It will be understood that modifications and variations may be effected without departing from the scope of the novel concepts of the present invention.

I claim as my invention:

1. In a method of making a sheet metal article, the steps of subdividing a portion of the article into a series of separated elongated strips with the ends of the strips integrally connected, and simultaneously relatively offsetting the ends of the strips while compressing the strips to bring the respective ends thereof closer together whereby to effect tilting of the strips into louver form.

2. In a method of making a sheet metal article, shaping the article to provide an annular area of generally dished radial curved shape bounded by radially inner and radially outer portions, subdividing said annular area along uniform spaced lines circumferentially angled from a true radius but leaving the strips of said annular area into which subdivided integrally connected to said radially inner and outer portions of the member, and relatively torsionally displacing said radially inner and outer portions of the member toward radial alignment of the subdivisions and thereby shortening said strips and compressing and twisting the same into tilted louvers.

3. In a method of making a circular sheet metal member such as a wheel cover, comprising drawing a sheet metal blank and thereby providing therein radially inner and radially outer annular substantially stiff portions and an intermediate radially curved annular uniform portion, transversely slotting said intermediate portion along lines angled uniformly circumferentially, and then relatively torsionally displacing said annular stiff portions to work the slots toward a radial disposition and thereby shorten and compress and twist and set the sections of said intermediate portion between the slots into air circulating louvers.

4. In a method of making a sheet metal article such as a wheel cover member, the steps of shaping a circular sheet metal body into radially inner and radially outer substantially rigid annular portions and an intermediate annular portion of a curved cross-section, finishing the surface of the article, thereafter slotting across the intermediate portion at uniform intervals at a circumferentially biased angle from a true radius, and thereafter relatively turning the radially inner and outer portions about the axis of the article and in relative directions to move the slots toward said true radius and thereby setting the separated areas of said intermediate portion by compression and bending and twisting and shortening thereof into tilted vane positions.

5. In a method of making a sheet metal article such as a wheel cover member, the steps of shaping a circular sheet metal body into radially inner and radially outer substantially rigid annular portions and an intermediate annular portion of curved cross-section, finishing the surface of the article, thereafter slotting across the intermediate portion at uniform intervals at a circumferentially biased angle from a true radius, thereafter relatively turning the radially inner and outer portions about the axis of the article and in relative directions to move the slots toward said true radius and thereby setting the separated areas of said intermediate portion by compression and bending and twisting and shortening thereof into tilted vane positions, and thereafter degreasing and plating the article.

6. A method of making a wheel cover which comprises drawing a thin sheet metal blank into a cover body including a circular annular and substantially rigid inner portion and a circular annular substantially rigid outer portion and an intermediate annular portion of substantial width and arched uniformly thereacross, slotting said intermediate portion transversely on lines angled circumferentially into a plurality of louver sections which are connected at their ends to said rigid portions, and relatively torsionally turning the inner and outer rigid portions about a common axis in relative directions to move the slots toward a radial position and thereby longitudinally compressing the sections of said intermediate portion and twisting and turning the same into louver shape.

7. In a method of making a sheet metal article out of a flat sheet metal piece, the steps of forming the piece into spaced apart substantially rigid annular portions with a dished annular intermediate portion, forming across said intermediate portion circumferentially uniformly angled slots, and circumferentially relatively displacing said spaced portions in directions to generally straighten said slots and thereby compress and shorten the sections of said intermediate portion between the slots and thus twist and turn the same into louvers.

8. In a method of making a sheet metal wheel cover, shaping a thin sheet metal piece to provide radially inner and radially outer annular substantially rigid portions and an intermediate generally radially extending axially outwardly arched portion, forming non-radial slots of predetermined width across said intermediate portion, shaping the edges of the slots into axially inwardly directed reinforcing and finishing flanges, and thereafter relatively torsionally displacing said radially inner and outer portions to move the ends of the sections between the slots toward radial position and thereby turning the sides of said sections defined by the flanged edges of the slots uniformly respectively axially inwardly and axially outwardly and setting said sections into louver form.

9. In a method of making a sheet metal article out of a sheet metal piece, the steps of forming the piece into spaced apart substantially rigid annular portions with an intermediate annular arched portion, forming across said intermediate arched portion a uniform series of spaced arcuate slots with the opposite ends adjacent to respectively said rigid annular portions, and circumferentially relatively displacing said rigid annular portions to shorten the distance between the opposite ends of said slots and similarly shorten the distance between the opposite ends of the sections of said arched portion between the slots so that the sections are longitudinally compressed and twisted and bent into tilted louver vane shape.

References Cited in the file of this patent

UNITED STATES PATENTS

| | | |
|---|---|---|
| 1,568,322 | Corne | Jan. 5, 1926 |
| 1,583,787 | Gersman | May 11, 1926 |
| 1,649,880 | Whitney | Nov. 22, 1927 |
| 1,958,484 | Lyon | May 15, 1934 |
| 2,141,719 | Lyon | Dec. 27, 1938 |
| 2,684,521 | Morrison | July 27, 1954 |